(12) United States Patent
Tran (10) Patent No.: US 8,386,857 B2
(45) Date of Patent: Feb. 26, 2013

(54) METHOD AND APPARATUS FOR MEASURING SYMBOL AND BIT ERROR RATES INDEPENDENT OF DISPARITY ERRORS

(75) Inventor: Que T. Tran, Beaverton, OR (US)

(73) Assignee: Tektronix, Inc., Beaverton, OR (US)

(*) Notice: Subject to any disclaimer, the term of this patent is extended or adjusted under 35 U.S.C. 154(b) by 221 days.

(21) Appl. No.: 13/084,412

(22) Filed: Apr. 11, 2011

(65) Prior Publication Data

US 2011/0271155 A1 Nov. 3, 2011

Related U.S. Application Data

(60) Provisional application No. 61/328,876, filed on Apr. 28, 2010.

(51) Int. Cl.
*G06F 11/00* (2006.01)
*G01R 31/28* (2006.01)
(52) U.S. Cl. ........................ 714/704; 714/737
(58) Field of Classification Search .................. 714/704, 714/709, 724, 737
See application file for complete search history.

(56) References Cited

U.S. PATENT DOCUMENTS

| | | | |
|---|---|---|---|
| 6,178,213 B1 * | 1/2001 | McCormack et al. | 375/355 |
| 6,829,253 B1 * | 12/2004 | Koorapaty et al. | 370/514 |
| 7,334,179 B2 * | 2/2008 | Zhang et al. | 714/764 |
| 7,636,387 B2 * | 12/2009 | Yamaguchi et al. | 375/224 |
| 7,933,321 B2 * | 4/2011 | Kernchen | 375/226 |
| 8,335,950 B2 * | 12/2012 | Tran | 714/707 |

OTHER PUBLICATIONS

Coulson, A.J.; , "Bit error rate performance of BPSK modulated OFDM synchronized using a pilot symbol," Personal, Indoor and Mobile Radio Communications, 2001 12th IEEE International Symposium on , vol. 2, No., pp. F-86-F-89 vol. 2, Sep./Oct. 2001.*
Maeda, K.; Asai, T.; Yoshino, H.; , "Successive multi-user detector with ordering for signals having different symbol rates," Personal, Indoor and Mobile Radio Communications, 2005. PIMRC 2005. IEEE 16th International Symposium on , vol. 4, No., pp. 2596-2601 vol. 4, Sep. 11-14, 2005.*

* cited by examiner

*Primary Examiner* — Cynthia Britt
(74) *Attorney, Agent, or Firm* — David A. Crowther; Thomas F. Lenihan

(57) ABSTRACT

A test and measurement instrument includes a pattern detector for detecting a beginning sequence in a signal under test (SUT), and generates a synchronization signal. In response to the synchronization signal, a memory outputs a reference test pattern. A symbol comparator compares the reference test pattern with the SUT. The symbol comparator can produce a symbol error rate. One or more 8b to 10b converters receives the SUT from the input and the digitized data from the memory, and converts the data from an 8b coded format to a 10b coded format. A bit comparator compares the 10b coded reference test pattern with the 10b coded SUT in response to the symbol comparator. The bit comparator is coupled to a bit error counter, which produces a bit error rate independent of any disparity errors that may be present in the incoming digitized data received by the test and measurement instrument.

20 Claims, 5 Drawing Sheets

METHOD AND APPARATUS FOR MEASURING SYMBOL AND BIT ERROR RATES INDEPENDENT OF DISPARITY ERRORS

CROSS REFERENCE TO RELATED APPLICATION

This application claims the benefit of U.S. Provisional Application Ser. No. 61/328,876, filed Apr. 28, 2010, herein incorporated by reference.

BACKGROUND

This disclosure relates to test and measurement instruments, and in particular, to a method and apparatus for measuring symbol error rates and bit error rates independent of disparity errors.

Test and measurement instruments, such as oscilloscopes, logic analyzers, or the like can be used to measure and analyze data. Over the course of several years, technical standards have emerged such as SATA, USB, IEEE 1394b, SAS, Fibre Channel, etc., which use encoding methods for balancing edge transitions in a stream of data. For instance, one such prevalent method is referred to as the 8b/10b encoding method, which encodes the symbols before transmitting them as a serial signal, thereby guaranteeing the edge density. The 8b/10b encoding scheme uses disparity to balance the number of positive and negative edges. For example, each standard 8-bit symbol can be represented in either one of two different 10-bit symbols. Each 10-bit symbol has associated with it one of two disparities, sometimes referred to as RD+ or RD−.

When the 10-bit symbols are transmitted, a "running disparity" or "RD" is associated with the data stream or signal and maintained during the transmission of the data. The RD of the signal is essentially the difference between the number of 1s transmitted and the number of 0s transmitted. It can be thought of as a residual value, which is used to choose which of the two 10-bits codes (e.g., having either a disparity of RD+ or a disparity of RD−) to transmit next in the data stream so that the running disparity of the signal fluctuates over time, but is limited to between −1 to +1.

As a result, the 8b/10b encoding method attempts to ensure that the number of transmitted 1s and 0s are essentially balanced. This results, for example, in more efficient clock recovery and improved bandwidth characteristics of the signal.

However, during the 8b/10b encoding process, disparity errors can be introduced into the data stream. Such disparity errors can inflate or otherwise distort the actual bit error rate of the data stream. For instance, a common control signal used in the 8b/10b encoding method is referred to as K28.5. The RD+ of K28.5 (i.e., K28.5+) is 1100000101, and the RD− of K28.5 (i.e., K28.5−) is the bit-wise inverse, i.e., 0011111010. Given that there are 10 bits of difference between the RD+ and RD− disparities of K28.5, if an errant disparity is chosen, one result is that the bit error rate can be erroneously inflated by an amount of 10.

Moreover, conventional techniques do not separate symbol error rates from bit error rates. In addition, conventional bit error rate measurements do not accurately reflect the actual bit error rate independent of any disparity errors that can be introduced into the signal.

Accordingly, a need remains for an improved method and apparatus for measuring symbol error rates and bit error rates independent of disparity errors.

DETAILED DESCRIPTION

Embodiments include test and measurement instruments and techniques for detecting symbol error rates and bit error rates independent of disparity errors in digitized data. The detected errors can be, for example, processed, measured, analyzed, used in acquisitions of data, among other suitable applications and uses. These and other features and embodiments of the present invention proceed with reference to each of the figures.

Figure 1:
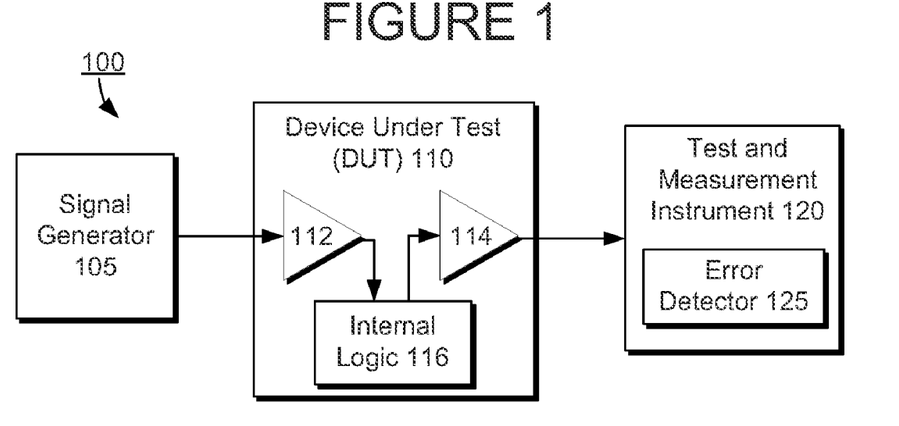
FIGS. 1 and 2 illustrate systems including a signal generator, a device under test, and a test and measurement instrument including an error detector.

FIG. 1 illustrates a system 100 including a signal generator 105, a device under test (DUT) 110, and a test and measurement instrument 120 including an error detector 125. The signal generator 105 can be any suitable device capable of generating a signal for testing purposes. The signal generator 105 can be, for example, a high speed serial generator such as an arbitrary waveform generator (AWG). The test signal that is generated can be purposely impaired with jitter, Spread Spectrum Clock (SSC), and/or the like so that the DUT 110 can be stress tested.

The DUT 110 can be any suitable digital or analog device capable of receiving and transmitting a signal. The DUT 110 can include, for example, a receiver 112, internal logic 116, and transmitter 114. An output of the DUT 110 can be coupled to a test and measurement instrument 120. The test and measurement instrument 120 can be an oscilloscope, a logic analyzer, a network analyzer, or the like. Generally, the test and measurement instrument 120 is referred to herein as an oscilloscope.

The oscilloscope 120 can include an error detector 125, which is configured to detect and measure symbol error rates and bit error rates independent of any disparity errors, which may be introduced into the signal under test. A more detailed description of the error detector 125 proceeds with reference to the figures that follow. In general, the DUT 110 can be configured as digital retimed loop back. Moreover, the system 100 can be configured to perform a receiver test with digital retimed loop back. Tests such as a Receive Margin Test can be performed using the oscilloscope 120 and error detector 125. The tests can be configured using a loop back mode, preferably a retimed loop back mode, to detect any error from the receiver of the DUT 110.

Figure 2:
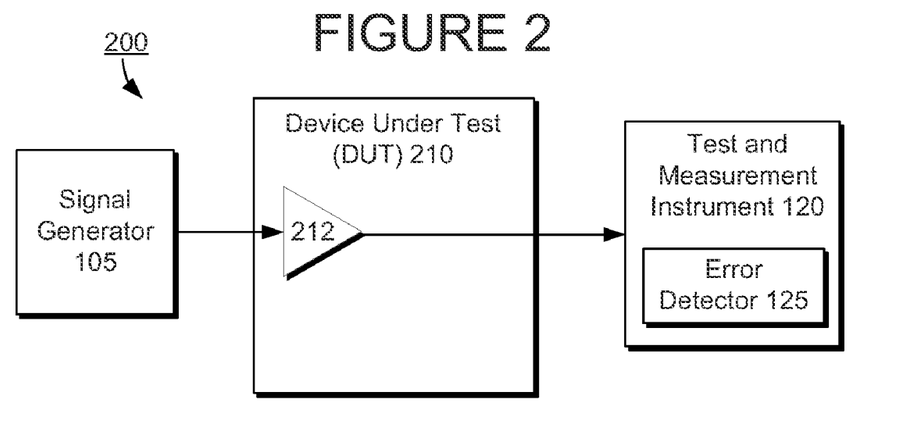

FIG. 2 illustrates a system 200 including a signal generator 105, a device under test 210, and a test and measurement instrument 120 including an error detector 125. The DUT 210 can include, for example, a receiver 212. An output of the DUT 210 can be coupled to the test and measurement instrument 120. In general, the DUT 210 can be configured as analog loop back. Moreover, the system 200 can be configured to perform a receiver test with analog loop back. Tests such as a Receive Margin Test can be performed using the oscilloscope 120 and error detector 125. The tests can be configured using a loop back mode, preferably an analog loop back mode, to detect any error from the receiver of the DUT 210. Some components of the system 200 are the same as or similar to the components of system 100 discussed above, and therefore a detailed explanation of these is not repeated.

Figure 3:
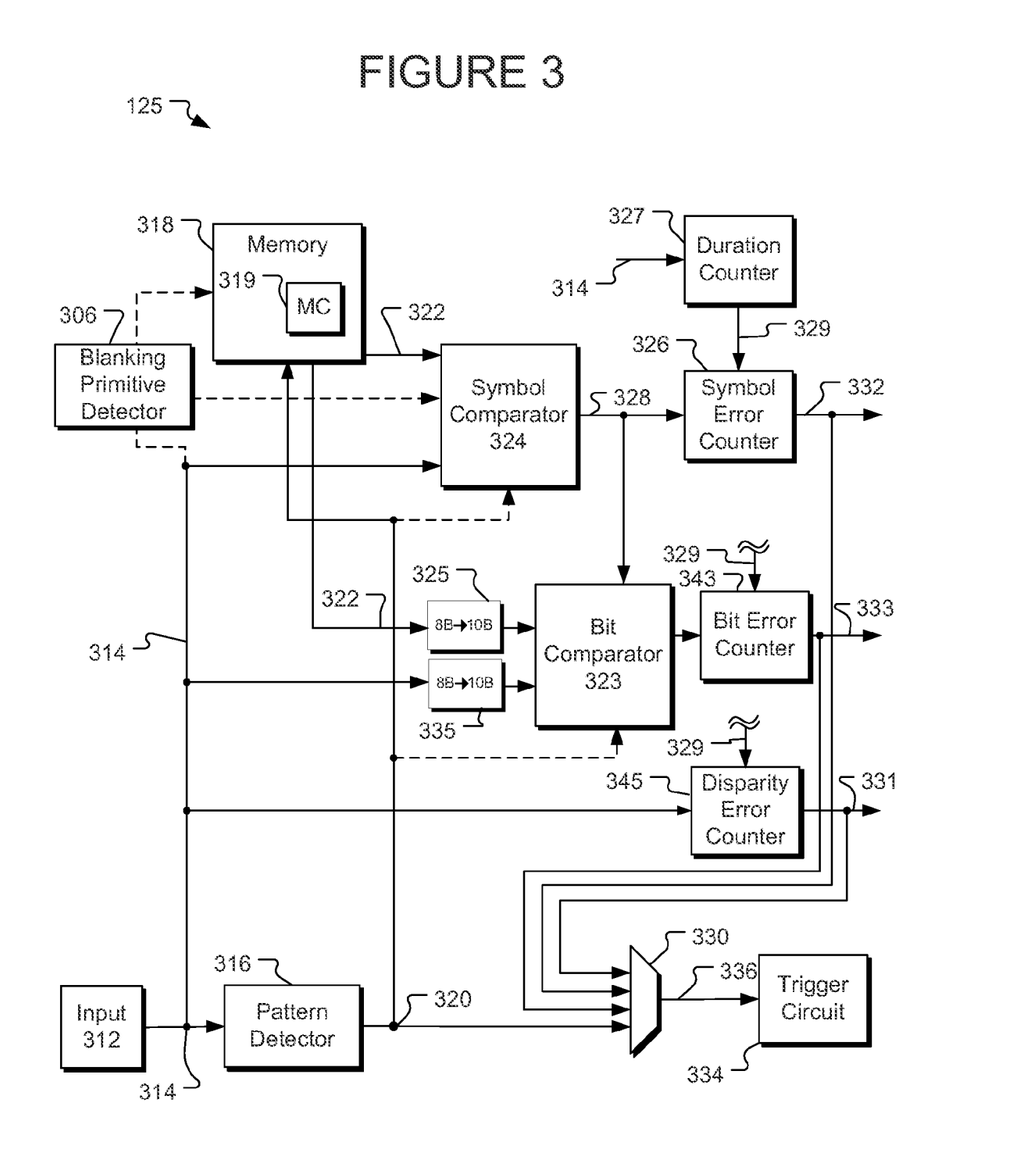
FIG. 3 illustrates a block diagram of the error detector of FIGS. 1 and 2, the error detector including an input, pattern detector, memory, memory controller, symbol comparator and bit comparator according to an example embodiment of the present invention.

FIG. 3 illustrates a block diagram of the error detector 125 of FIGS. 1 and 2, the error detector including an input 312, pattern detector 316 coupled to the input 312, memory 318, memory controller 319, symbol comparator 324 coupled to the input 312, and bit comparator 323, according to an example embodiment of the present invention.

The input 312 is configured to receive a signal and output digitized data 314. In some embodiments, the signal can be a digital signal. In some embodiments, the signal can be an analog signal representing the digitized data 314. For example, the input 312 can include a clock and data recovery circuit (CDR). The CDR can recover the digitized data 314 encoded in the signal. In another embodiment, the input 312 can include an analog to digital converter configured to convert the signal into a digitized representation of the signal. Additional circuitry can convert the digitized signal into digitized data 314 of one form or another. For instance, the input 312 can include one or more 10b to 8b converters, which can convert symbols from a 10b coded format to an 8b coded format, or vice versa. It should be understood that any circuitry that can recover digitized data 314 encoded within the signal can be used as the input 312.

The digitized data 314 can be represented in a variety of formats. For example, the digitized data 314 can be serial data or parallel data. The digitized data 314 can include running disparity (RD) information, status information, and the like. The digitized data 314 can include additional information, signals, or the like associated with the data. For example, as described above, the input 312 can be a CDR. Thus, the digitized data 314 can include a recovered clock. In another example, the digitized data 314 can include framing information, such as frame errors, illegal code information, such as an illegal 8b/10b code sequence, synchronization loss information, or the like. Any such information can be included with the digitized data 314. In another example, digitized data 314 can be retimed de-multiplexed data from the CDR.

The memory 318 can be any variety of memory. For example, the memory 318 can be dynamic memory, static memory, read-only memory, random-access memory, or the like. The memory 318 can be configured to store reference digitized data including a reference test pattern. For example, the reference digitized data can be a pseudorandom bit sequence. The reference digitized data can be a particular series of ones or a series of zeros appropriate for the length of the pseudorandom pattern. In another example, the reference digitized data can be a user-defined pattern, an industry standard pattern, or the like. The reference test pattern can be any sequence of data that is unique within the entire repeated pattern. In addition, the reference digitized data can include a beginning sequence, which can be used to align error detection, described in detail below.

The memory 318 can include a memory controller 319. The memory controller 319 can be configured to cause the memory 318 to output the reference digitized data 322 in response to a synchronization signal 320. In some embodiments, the memory controller 319 can be integrated with the memory 318. However, in another embodiment, the memory controller 319 can be separate from the memory 318. For example, the memory controller 319 can be part of a control system of the test and measurement instrument 120. The reference digitized data 322 can be previously written into the memory 318 by a processor in an 8b coded format in preparation for testing the signal under test. Alternatively, the reference digitized data 322 can be learned through processing of data by the error detector 125, and stored or otherwise updated as 8b coded symbols in the memory 318.

The pattern detector 316 can be configured to detect a beginning sequence in the digitized data 314 and generate a synchronization signal 320 in response. In some embodiments, the pattern detector 316 can be part of a triggering system. For example, the triggering system can be configured to detect a character, bit sequence, alignment information, or the like within the digitized data 314. The beginning sequence or other similar data patterns are an example of such a pattern in the digitized data 314 that can be detected. Although the pattern detector 316 has been described as part of other circuitry, the pattern detector 316 can be separate from such other systems, such as being an input to a trigger circuit 334.

The pattern detector 316 is configured to output the synchronization signal 320. The synchronization signal 320 can be a single signal or multiple signals. For example, the synchronization signal 320 can include information related to an alignment of the reference test pattern or sequence within the digitized data 314. The digitized data 314 can be multiple bits wide. The synchronization signal 320 can include an indication of in which bit the reference test pattern sequence begins. In some embodiments, the digitized data 314 can be grouped or otherwise coded in 8-bit blocks or "symbols." The reference test pattern sequence stored in the memory 318 can also include one or more of such blocks or symbols stored in an 8-bit coded format. The synchronization signal 320 can indicate which of the blocks or symbols of the digitized data 314 include the beginning sequence, i.e., the one with the beginning of the reference test pattern sequence, or the like.

The error detector 125 can include, for example, a symbol comparator 324, a bit comparator 323, and one or more 8b to 10b converters such as 325 and 335. The symbol comparator is coupled to the memory 318 and the input 312, and can also be configured to directly receive the synchronization signal 320. The 8b to 10b converter 325 is coupled to the memory 318 and can receive the reference digitized data from the memory 318, convert the data from the 8b coded format to a 10b coded format, and output the converted data to the bit comparator 323. The 8b to 10b converter 335 is coupled to the input 312 and can receive the digitized data 314, or in other words the signal under test, from the input 312 and convert the received data from the 8b coded format to a 10b coded format, and output the converted data to the bit comparator 323.

In response to the synchronization signal 320, the memory 318 can be configured to output the reference digitized data 322 including the reference test pattern 322. The output reference digitized data 322 can be aligned appropriately to the digitized data 314 such that the reference digitized data 322 that is output to the symbol comparator 324 and/or the bit comparator 323 can be the data that is expected in the digitized data 314. Although the beginning sequence can cause the synchronization signal 320 to be generated, the beginning sequence can, but need not be, the start of the reference digitized data 322 output from the memory 318. For example, an amount of time may have passed since the recognition of the beginning sequence. The output of the reference digitized data 322 can be controlled appropriately such that even though the beginning sequence is no longer present in the digitized data 314, the appropriate reference digitized data 322 is output corresponding to the current expected digitized data 314. In some embodiments, the synchronization signal 320 can reflect such an offset.

The symbol comparator 324 can be configured to compare the 8b coded reference digitized data 322 output from the memory to the 8b coded digitized data 314. The comparison can be performed in a variety of ways. In some embodiments, the symbol comparator 324 can be configured to compare bits of the reference digitized data 322 to bits of the digitized data 314 in parallel. In some embodiments, the symbol comparator 324 is configured to compare the 8b coded reference test pattern 322 with the 8b coded signal under test 314. The output of the symbol comparator 328 can be serial or parallel data indicating whether the associated symbol of the digitized data 314 matches the reference digitized data 322.

The output of the symbol comparator 324 can be provided to a symbol error counter 326, which is coupled to the symbol comparator 324. The symbol error counter 326 can be configured to perform various analyses of the digitized data in response to the comparison result signal, i.e., the symbol error signal 328. For example, the symbol error counter 326 is configured to produce a count of the number of symbol errors over a period of time, or in other words, the number of error symbols versus the number of symbols that have been monitored. In some embodiments, the symbol error counter 326 can be configured to determine a symbol error rate responsive to the symbol comparator 324, indicate if any symbol has an error, count the number of symbol errors, indicate a location of one or more error symbols, or the like. Such information can be represented in the symbol error signal 332.

Moreover, the error detector 125 can include a duration counter 327 coupled to the symbol error detector 326. The duration counter 227 can be configured to generate a signal 329 to reset the symbol error counter 326, enable the symbol error counter 326, or the like. The duration counter can also be configured to output a time duration. Accordingly, the elapsed time can be used to calculate error rates, gate the error detection over a time period, or the like.

In some embodiments, the duration counter 327 can be configured to count a number of elapsed bits. For example, the duration counter 327 can be configured to receive the digitized data 314. In another embodiment, the duration counter 327 can be configured to receive a clock signal associated with the digitized data 314. Thus, the duration counter 327 can determine the number of elapsed bits. Accordingly, error rates such as errored bits per elapsed bits can be calculated.

Furthermore, the duration counter 327 can be configured to measure any span associated with the digitized data 314. That is, as described above, time and number of bits can be used in the analysis of errors. However, other factors can be used, such as number of frames, number of code words, symbols, or the like.

As mentioned above, in response to the synchronization signal 320, the memory 318 and can be configured to output the reference digitized data 322 including the reference test pattern 322. The 8b to 10b converter 325 converts the 8b coded symbols received from the memory 318 to a 10b coded format, and transmits the 10b coded symbols to the bit comparator 323. The bit comparator 323 can be configured to compare the 10b coded reference digitized data 322 output from the memory to the 10b coded digitized data 314. In some embodiments, the comparison is performed bit-by-bit. In some embodiments, the comparison is performed in response to the symbol error signal 328. In other words, if the symbol comparator 324 detects a symbol error in an 8b coded symbol, then the bit comparator 323 can check for bit errors in the corresponding 10b coded symbol.

As mentioned above, during the 8b/10b encoding process, or during internal logic processing of the DUT 110, disparity errors can be introduced into the data stream. Such disparity errors can be the result of aligned primitives, order sets, clock alignment, shift sequences, or the like, inserted or introduced into the signal under test. Such disparity errors can inflate or otherwise distort the actual bit error rate of the data stream. The reference test pattern is generally fixed in length and its contents. When the contents of the incoming digitized data 314 is varied because of the different disparities (i.e., because of each 8b symbol being represented as one of two 10b symbols), then the monitoring of the bit errors would otherwise generate an erroneously high count. To avoid such erroneous conclusions, the bit-by-bit comparison, which is performed by the bit comparator 323, synchronizes and then compares the incoming digitized data 314 to the reference test pattern data 322 from the memory 318, in response to the symbol comparator first providing an indication of a symbol error using signal 328.

In other words, the symbol comparator 324 receives the digitized data 314 from the input in an 8b coded format and compares the data to the reference test pattern 322 from the memory 318. At this point, if nothing further was performed, the detection of errors would be solely 8b symbol based. However, the number of error bits in a given 8b symbol does not necessarily represent the number of error bits in a corresponding 10b symbol representing one of two disparities for the symbol, which is the actual coding that is transmitted from the DUT 110 to the error detector 125 of the oscilloscope 120.

To calculate the actual bit errors that occur in a symbol, the 8b to 10b converters 325 and 335 receive the 8b coded symbols from both the memory 318 and the input 312, the running disparity (RD) of the signals (i.e., for both the signal under test 314 and the reference test pattern 322), and/or the disparity error status, and use these values to convert the 8b coded signals to a 10b coded format. If the symbol comparator 324 determines that an 8b coded symbol in the digitized data 314 does not match a corresponding 8b coded symbol from the reference test pattern 322, then the symbol error signal 328 causes the bit comparator to check for bit errors in the corresponding 10b coded symbol, for either or both disparities (i.e., RD+ and/or RD−).

Put differently, the bit comparator 323 is configured to compare a 10b coded symbol from the reference test pattern 322 with a 10b coded symbol from the signal under test 314 in response to the symbol comparator 324 detecting a symbol error 328 associated with a corresponding 8b coded symbol. If, on the other hand, the symbol comparator 324 does not detect a symbol error, then the disparity error counter 345 is configured to check for or otherwise detect a disparity error. The symbol error counter can be coupled to the disparity error counter 345 and signal it to check for disparity errors if necessary. If a disparity error is detected, then the disparity error signal 331 can be produced by the disparity error counter 345. Moreover, the disparity error counter 345 can receive the signal 329 from the duration counter 327, which can reset the disparity error counter 345, enable the disparity error counter 345, or the like.

Any disparity errors, which may be present in the symbols, are counted separately using the disparity error counter 345. In this manner, the bit error counter 343 produces a count of the number of actual bit errors over a period of time, excluding disparity errors from the count. Thus, the disparity errors are counted separately from the bit errors.

In other words, the bit error counter 343, which is coupled to the bit comparator 323, is configured to determine a bit error rate independent of any disparity error. For instance, if the DUT 110 introduces one or more disparity errors into the signal under test, the bit error counter 343 determines the bit error rate responsive to the bit comparator 323 and independent of the one or more disparity errors produced by the DUT 110, or otherwise introduced into the data stream.

The bit-by-bit comparison can be performed by the bit comparator 323 in a variety of ways. In some embodiments, the bit comparator 323 can be configured to compare bits of the reference digitized data 322 (converted to a 10b coding) to bits of the digitized data 314 (converted to a 10b coding), in parallel. In some embodiments, the bit comparator 323 is configured to compare the 10b coded reference test pattern 322 with the 10b coded signal under test 314 one bit at a time. The output of the bit comparator 323 can be serial or parallel data indicating whether the associated bits of the 10b coded digitized data 314 matches the 10b coded reference digitized data 322.

The output of the bit comparator 323 can be provided to a bit error counter 343, which is coupled to the bit comparator 323. The bit error counter 343 can be configured to perform various analyses of the digitized data in response to the comparison at 323. For example, the bit error counter 343 is configured to produce a count of the number of bit errors over a period of time. In some embodiments, the bit error counter 343 can be configured to determine a bit error rate responsive to the bit comparator 323, count the number of bit errors, indicate a location of one or more bit errors, or the like. Such information can be represented in the bit error signal 333. Moreover, the bit error counter 343 can receive the signal 329 from the duration counter 327, which can reset the bit error counter 343, enable the bit error counter 343, or the like.

In addition, a blanking primitive detector 306 can be used to cause the memory controller 319 to skip any order sets, aligned primitives, clock alignment, shift sequences, or the like, which may be present in the incoming digitized data 314. In other words, if there are portions of the digitized data 314 that are to be ignored, the blanking primitive detector 306 can cause other components of the error detector 125 to ignore those portions. The blanking primitive detector 306 can also be coupled, for example, to the symbol comparator 324 to cause the symbol comparator to skip any order sets, aligned primitives, clock alignment, shift sequences, or the like.

The symbol error signal 332, the bit error signal 333, the disparity error signal 331, and the synchronization signal 320 can be input to a selector 330. The selector 330 can be configured to select from among the symbol error signal 332, the bit error signal 333, the disparity error signal 331, and the synchronizations signal 320, other signals, or the like. The selected signal 336 can be input to the trigger circuit 334. Although the synchronization signal 320 from the pattern detector 316 has been described as being input to the selector 330, the synchronization signal 320 and/or the error signals 332, 333, and/or 331 can be supplied to the trigger circuit 334 without selection from among other signals.

Accordingly, as the error signals 332, 333, and/or 331 are available to the trigger circuit 334, an acquisition of the test and measurement instrument 120 can be triggered in response to the error signal(s). For example, an acquisition can be triggered on a single error, on a number of errors, on an error in a particular location within the digitized data 314, or the like. As a result, a user can focus attention on the errored portion of the digitized data 314.

In some embodiments, the reference digitized data 322 can be user defined digitized data. As illustrated by the dashed line input to the memory 318, the digitized data 314 received from the input 312 can be input to the memory 318. Accordingly, the digitized data 314 can be stored in the memory 318. Thus, the stored digitized data 314 can be used as the reference digitized data 322.

As a result, the reference digitized data 322 need not be limited to predefined sequences, sequences generated by an algorithm, or the like. The reference digitized data can be any data sequence the user desires with an appropriate reference sequence. Once the user digitized data is stored in the memory 318, the reference sequence can be identified. For example, the user can provide an address of the sequence within the pattern, the user identify the unique sequence, which the memory controller 319 or other processor can locate in the stored user digitized data, the memory controller 319 can search for a unique sequence in the user digitized data, or the like. Thus, such a reference sequence can be provided to the pattern detector 316 for subsequent comparisons of the user digitized data to newly input digitized data 314.

Figure 4:
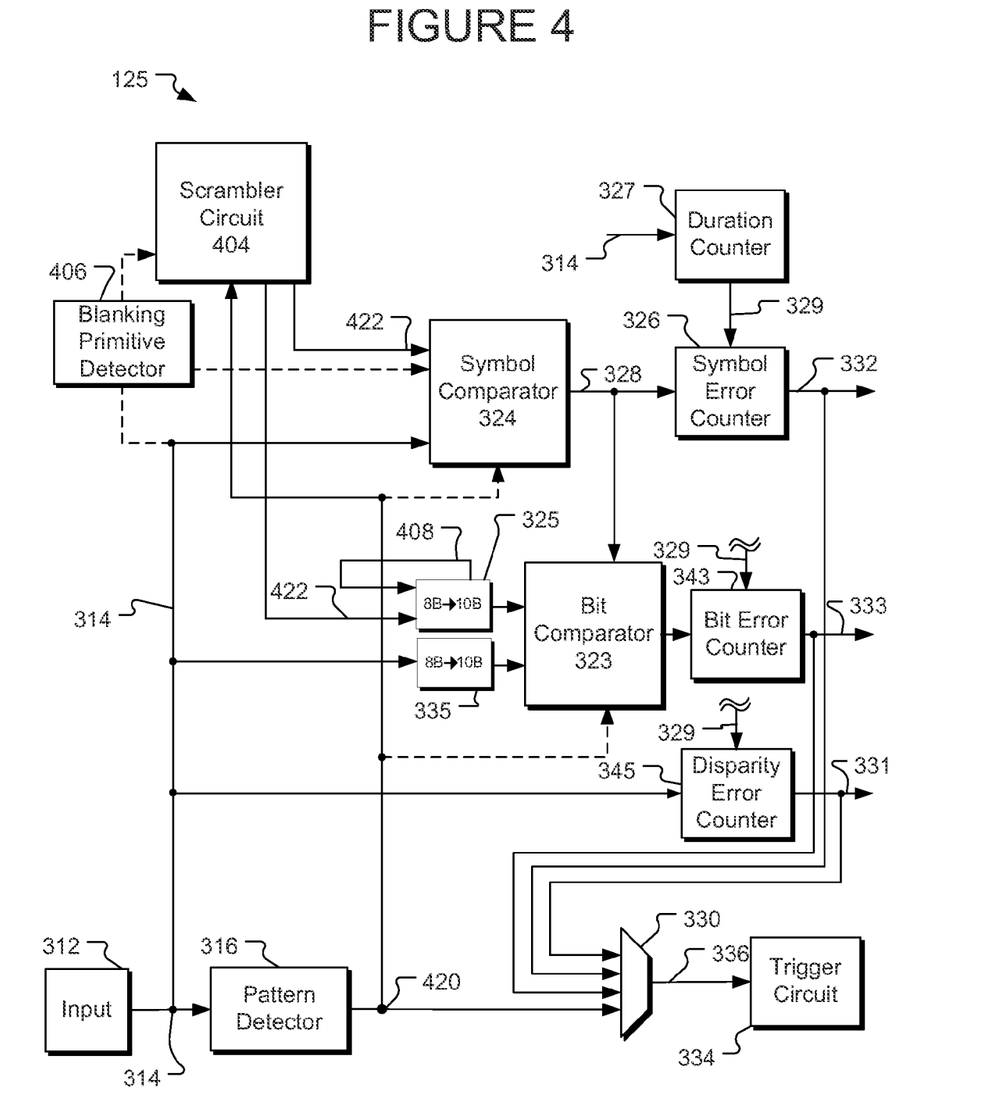
FIG. 4 illustrates a block diagram of the error detector of FIGS. 1 and 2, the error detector including an input, pattern detector, scrambler circuit, symbol comparator and bit comparator according to another example embodiment of the present invention.

FIG. 4 illustrates a block diagram of the error detector 125 of FIGS. 1 and 2, the error detector including an input 312, pattern detector 316, scrambler circuit 404, symbol comparator 324 and bit comparator 323 according to another example embodiment of the present invention. Some of the components of FIG. 4 are the same as or similar to components of the error detector 125 represented in FIG. 3. For the sake of brevity, a description of their structure and function will not be repeated.

The error detector 125 of FIG. 4 includes the scrambler circuit 404, which can produce a scrambled test pattern or sequence 422. For instance, the D0.0 pattern can be scrambled in an 8b coding format (i.e., hex 00) using the appropriate USB3.0 polynomial. The compliance pattern CP0, as used in the USB3.0 standard, for example, is the scrambled D0.0 pattern. Because of the length of the pattern (e.g., 655360 bits), the pattern can often exceed the capacity of the memory for storing the reference test pattern. Thus, the test pattern can be created or re-created using the scrambler 404. The pattern detector 316 can be configured to monitor the incoming digitized data 314 to detect the beginning sequence of the scrambled test sequence. Such detection of the beginning sequence can cause a signal, such as the scrambler reset signal 420, to signal the scrambler circuit 404 to begin its scrambling operation so that the scrambled test pattern or sequence 422 can be transmitted to the symbol comparator 324 and/or the 8b to 10b converters 325/335, and eventually to the bit comparator 323 in 10b coded format. In other words, the scrambler reset signal 420 is used to perform synchronization of the incoming digitized data 314 and the reference test pattern or sequence output by the scrambler circuit 404.

The scrambler circuit 404 outputs the reference test pattern or sequence in 8b coded format, and the input 312 transfers the digitized data 314 to the symbol comparator 324 in 8b coded format. The digitized data 314 received by the 8b to 10b converter 335 can include running disparity (RD) information, and also receives digitized data 314 in 8b coded format. The 8b to 10b converters convert the data to a 10b coded format using the RD information and any other suitable information such as RD status information, which can also accompany or otherwise be associated with the digitized data 314. The 8b to 10b converter 325 receives the 8b coded scrambled reference test pattern or sequence 422 from the scrambler circuit 404, and produces and maintains the running disparity (RD) value 408 for the scrambled test pattern sequence, which can also be used to convert the scrambled test pattern sequence from the 8b coded format to the 10b coded format.

In addition, a blanking primitive detector 406 can be used to cause the scrambler circuit 404 to skip any order sets, aligned primitives, clock alignment, shift sequences, or the like, which may be present in the incoming digitized data 314. In other words, if there are portions of the digitized data 314 that are to be ignored, the blanking primitive detector 406 can cause other components of the error detector 125 to ignore those portions. The blanking primitive detector 406 can also be coupled, for example, to the symbol comparator 324 to cause the symbol comparator to skip any order sets, aligned primitives, clock alignment, shift sequences, or the like.

The techniques and structure for producing symbol error rates and bit error rates independent of disparity errors, can also be performed using the components of the example embodiment of the error detector 125 of FIG. 4. A detailed description is provided above and therefore is omitted here.

Figure 5:
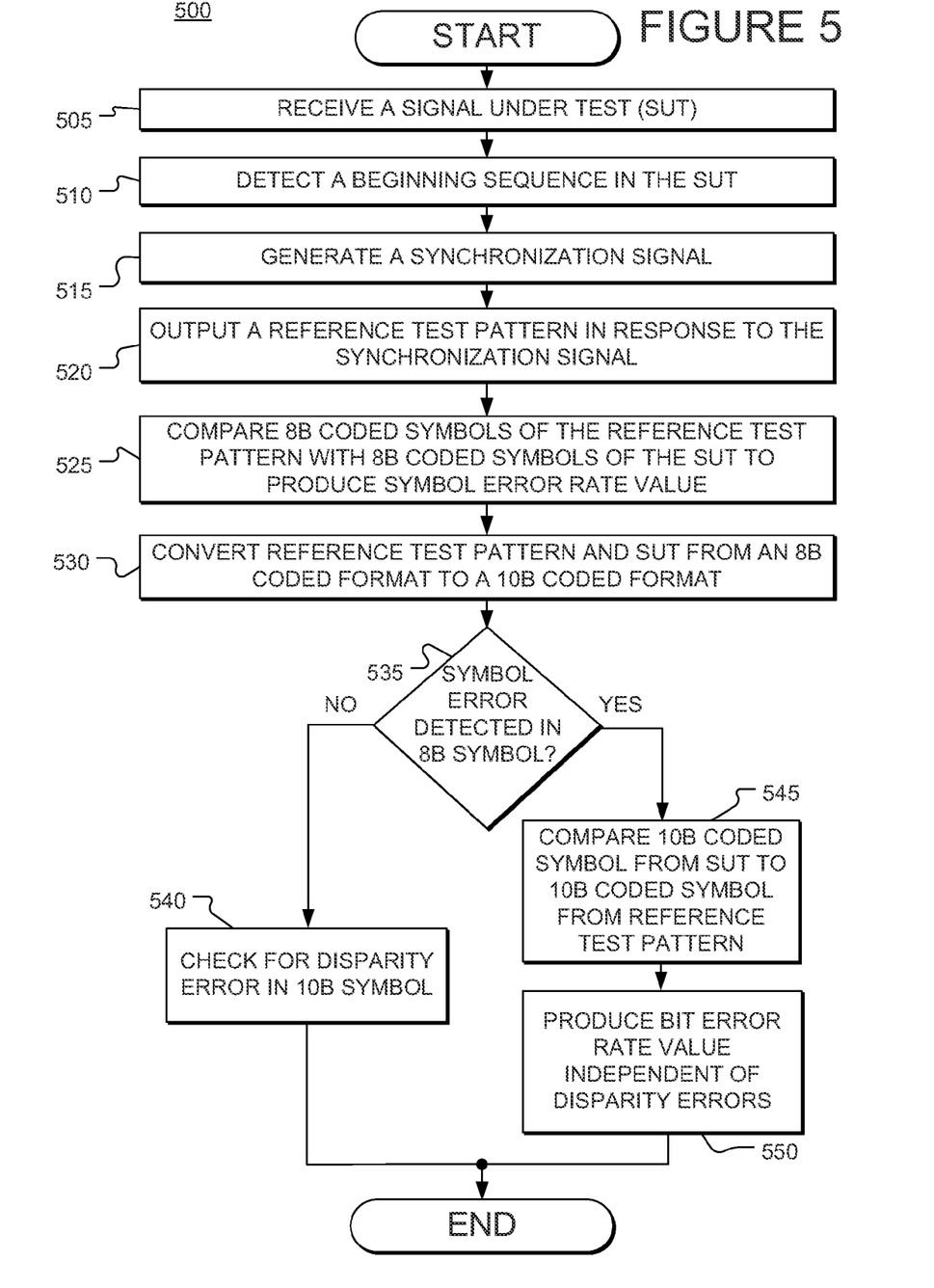
FIG. 5 illustrates a flow diagram of an example technique for measuring a symbol error rate and a bit error rate independent of disparity errors according to some example embodiments of the present invention.

FIG. 5 illustrates a flow diagram 500 of an example technique for measuring a symbol error rate and a bit error rate independent of disparity errors according to some example embodiments of the present invention. As a preparatory step, digitized data can be stored in a memory including a reference test pattern and a beginning sequence. Where a scrambler circuit is used, such preparatory step is unnecessary. At 505, a signal under test is received by the input of the error detector. A beginning sequence is detected in the signal under test at 510 using the pattern detector. When the beginning sequence is detected, a synchronization signal is generated at 515. The symbol comparator then compares at 525 8b coded symbols of the reference test pattern with 8b coded symbols of the signal under test to produce a symbol error rate value. Meanwhile, at 530, one or more 8b to 10b converters can be converting both the reference test pattern and the signal under test from an 8b coded format to a 10b coded format.

At 535, a determination is made whether the symbol comparator detected a symbol error in a given 8b symbol. If YES, the flow proceeds to 545, where the bit comparator compares a corresponding 10b coded symbol from the signal under test to an associated 10b coded symbol from the reference test pattern, as described in detail above. The bit comparator, at 550, can also produce a bit error rate value independent of any disparity errors. Otherwise, if NO, the flow proceeds to 540 and the disparity error counter can count any disparity errors, for example, as may be present in a corresponding 10b symbol.

Figure 6:
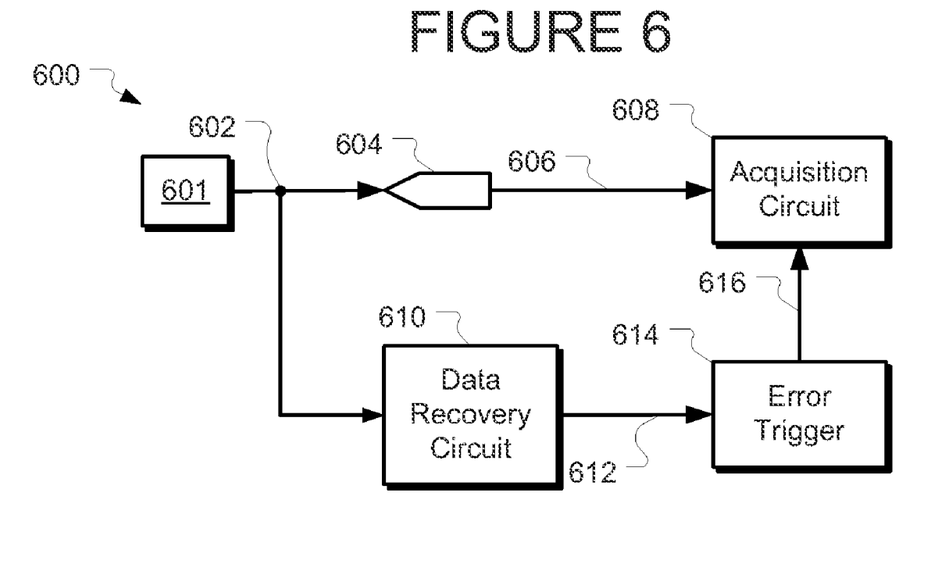
FIG. 6 illustrates a block diagram of a test and measurement instrument according to some embodiments of the present invention.

FIG. 6 illustrates a block diagram 600 of a test and measurement instrument according to some embodiments of the present invention. In some embodiments, the test and measurement instrument 600 includes an input 601 configured to receive an input signal 602. A digitizer 604 is coupled to the input 601 and configured to digitize the input signal 602 into a digitized signal 606. The digitized signal 606 can be acquired by an acquisition circuit 608. In some embodiments, the input 601, digitizer 604, and acquisition circuit 608 can be a channel of an oscilloscope, logic analyzer, or the like.

In addition, the test and measurement instrument 600 can also include a data recovery circuit 610. The data recovery circuit 610 can recover digitized data 612 encoded in the input signal 602. Although both the digitizer 604 and the data recovery circuit 610 are digitizing the input signal 602 in some fashion, the digitizer 604 and the data recovery circuit 610 can perform different digitization operations. For example, the digitizer 604 can be a 10-bit analog-to-digital converter of an oscilloscope. Thus, the digitized signal 606 is a digitized version of an analog input signal 602. In contrast, the data recovery circuit 610 can recover the digitized data encoded in the analog input signal 602.

The data recovery circuit 610 can be a variety of circuits. For example, similar to the input 12 described above, the data recovery circuit can include one or more 10b to 8b converters, a clock and data recovery circuit (CDR), a demodulator, such as a quadrature amplitude modulation (QAM) demodulator or a frequency modulation (FM) demodulator, an optical receiver, or any other circuit that can recover digitized data encoded within the input signal 602.

As a result, the recovered digitized data 612 can be provided to an error detector or error trigger 614. The error detector or error trigger 614 can be a system such as the one described above. An acquisition of the acquisition circuit 608 can be triggered in response to the error trigger. Thus, a representation of the data in one format, such as a digitized analog signal format, can be acquired in response to an error or any other resulting information encoded within the input signal 602.

Although the error trigger 614 has been described as triggering an acquisition of the acquisition circuit 608, other trigger circuitry can be used in combination with the bit-error trigger 614. Accordingly, a bit-error can be incorporated into any simple or complex trigger equation.

Although particular embodiments have been described, it will be appreciated that the principles of the invention are not limited to those embodiments. Variations and modifications may be made without departing from the principles of the invention as set forth in the following claims.

The invention claimed is:

1. A test and measurement instrument, comprising:
an input to receive a signal under test;
a memory to store digitized data including a reference test pattern and a beginning sequence;
a pattern detector to detect the beginning sequence in the signal under test and generate a synchronization signal in response;
a memory controller to cause the memory to output the reference test pattern responsive to the synchronization signal;
a symbol comparator to compare the reference test pattern from the memory with the signal under test;
one or more 8b to 10b converters to receive the signal under test from the input and the digitized data from the memory, and to convert the received data from an 8b coded format to a 10b coded format; and
a bit comparator coupled to the one or more 8b to 10b converters, the bit comparator configured to compare the 10b coded reference test pattern with the 10b coded signal under test.

2. The test and measurement instrument of claim 1, further comprising:
a bit error counter coupled to the bit comparator, wherein the bit error counter is configured to determine a bit error rate independent of any disparity error.

3. The test and measurement instrument of claim 2, wherein the input of the test and measurement instrument is configured to receive the signal under test from a device under test, and the bit error counter is configured to determine the bit error rate responsive to the bit comparator and independent of one or more disparity errors produced by the device under test.

4. The test and measurement instrument of claim 1, further comprising:

a symbol error counter coupled to the symbol comparator, wherein the symbol error counter is configured to determine a symbol error rate responsive to the symbol comparator.

5. The test and measurement instrument of claim 4, wherein:
the memory is coupled to the symbol comparator; and
the symbol comparator is configured to receive the reference test pattern from the memory in an 8b coded format and the signal under test in an 8b coded format.

6. The test and measurement instrument of claim 5, wherein:
the symbol comparator is configured to compare the 8b coded reference test pattern with the 8b coded signal under test; and
the symbol error counter is configured to produce a count of the number of symbol errors over a period of time.

7. The test and measurement instrument of claim 4, wherein:
the symbol error counter is coupled to the bit comparator; and
the bit comparator is configured to compare a 10b coded symbol from the reference test pattern with a 10b coded symbol from the signal under test responsive to the symbol comparator detecting a symbol error associated with a corresponding 8b coded symbol.

8. The test and measurement instrument of claim 7, wherein the bit error counter is configured to produce a count of the number of bit errors over a period of time, wherein disparity errors are excluded from the count.

9. The test and measurement instrument of claim 4, further comprising a disparity error counter configured to produce a disparity error rate value.

10. The test and measurement instrument of 9, wherein:
the symbol error counter is coupled to the disparity error counter; and
the disparity error counter is configured to detect a disparity error responsive to the symbol comparator not detecting a symbol error.

11. The test and measurement instrument of claim 1, further comprising:
a symbol error counter coupled to the symbol comparator, the symbol error counter configured to count one or more symbol errors;
a bit error counter coupled to the bit comparator, the bit error counter configured to count one or more bit errors;
a disparity error counter configured to count one or more disparity errors;
a selector configured to select from among the output of the symbol error counter, the bit error counter, the disparity error counter, and the synchronization signal.

12. The test and measurement instrument of claim 11, further comprising:
a trigger circuit configured to trigger an acquisition of the signal under test responsive to an output of the selector.

13. A method for measuring symbol and bit error rates independent of disparity errors, the method comprising:
storing digitized data in a memory including a reference test pattern and a beginning sequence;
receiving a signal under test;
detecting the beginning sequence in the signal under test;
generating a synchronization signal responsive to the beginning sequence;
outputting, from the memory, the reference test pattern responsive to the synchronization signal;
comparing 8b coded symbols of the reference test pattern from the memory with 8b coded symbols of the signal under test to produce a symbol error rate value;
converting the reference test pattern and the signal under test from an 8b coded format to a 10b coded format; and
comparing bit-by-bit the 10b coded reference test pattern with the 10b coded signal under test.

14. The method of claim 13, wherein:
the signal under test includes one or more disparity errors; and
comparing bit-by-bit includes determining a bit error rate value independent of the one or more disparity errors.

15. The method of claim 13, further comprising:
detecting a symbol error responsive to comparing the 8b coded symbols; and
comparing bit-by-bit a corresponding 10b coded symbol from the reference test pattern with a 10b coded symbol from the signal under test responsive to the symbol error.

16. The method of claim 13, further comprising:
detecting, using a symbol error counter, the symbol error rate value.

17. The method of claim 13, further comprising:
checking for a symbol error in an 8b coded symbol from the signal under test; and
when a symbol error is not found, detecting, using a disparity error counter, a disparity error in a corresponding 10b coded symbol from the signal under test.

18. The method of claim 13, further comprising:
triggering a test and measurement instrument responsive to at least one of a symbol error, a bit error, a disparity error, and the synchronization signal.

19. A test and measurement instrument, comprising:
an input to receive a signal under test;
a scrambler circuit to produce digitized data including a reference test pattern and a beginning sequence;
a pattern detector to detect the beginning sequence in the signal under test and generate a synchronization signal in response;
the scrambler circuit to output the reference test pattern responsive to the synchronization signal;
a symbol comparator to compare the reference test pattern from the scrambler circuit with the signal under test;
one or more 8b to 10b converters to receive the signal under test from the input and the digitized data from the scrambler circuit, and to convert the received data from an 8b coded format to a 10b coded format; and
a bit comparator coupled to the one or more 8b to 10b converters, the bit comparator configured to compare the 10b coded reference test pattern with the 10b coded signal under test.

20. The test and measurement instrument of claim 19, further comprising:
a bit error counter coupled to the bit comparator, wherein the bit error counter is configured to determine a bit error rate independent of any disparity error;
a symbol error counter coupled to the symbol comparator, wherein the symbol error counter is configured to determine a symbol error rate responsive to the symbol comparator;
wherein:
the scrambler circuit is coupled to the symbol comparator;
the symbol comparator is configured to receive the reference test pattern from the scrambler circuit in an 8b coded format and the signal under test in an 8b coded format;

the symbol comparator is configured to compare the 8b coded reference test pattern with the 8b coded signal under test;
the symbol error counter is configured to produce a count of the number of symbol errors over a period of time;
the symbol error counter is coupled to the bit comparator; and the bit comparator is configured to compare a 10b coded symbol from the reference test pattern with a 10b coded symbol from the signal under test responsive to the symbol comparator detecting a symbol error associated with a corresponding 8b coded symbol.

* * * * *